(12) United States Patent
Li et al.

(10) Patent No.: US 12,494,053 B2
(45) Date of Patent: Dec. 9, 2025

(54) MULTI-AXIS VISION TRANSFORMER

(71) Applicant: Google LLC, Mountain View, CA (US)

(72) Inventors: Yinxiao Li, Sunnyvale, CA (US); Feng Yang, Sunnyvale, CA (US); Peyman Milanfar, Menlo Park, CA (US); Han Zhang, Sunnyvale, CA (US); Zhengzhong Tu, Austin, TX (US); Hossein Talebi, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/902,546

(22) Filed: Sep. 30, 2024

(65) Prior Publication Data

US 2025/0022269 A1    Jan. 16, 2025

Related U.S. Application Data

(63) Continuation of application No. PCT/US2023/016952, filed on Mar. 30, 2023.

(60) Provisional application No. 63/325,356, filed on Mar. 30, 2022.

(51) Int. Cl.
  *G06V 10/82*   (2022.01)
  *G06V 10/77*   (2022.01)

(52) U.S. Cl.
  CPC .......... *G06V 10/82* (2022.01); *G06V 10/7715* (2022.01)

(58) Field of Classification Search
  None
  See application file for complete search history.

(56) References Cited

U.S. PATENT DOCUMENTS

| 2023/0116969 A1* | 4/2023 | Zhao ................. G06F 16/438 707/722 |
| 2023/0255581 A1 | 8/2023 | Jang et al. |
| 2024/0282119 A1 | 8/2024 | Niu et al. |

OTHER PUBLICATIONS

Arnab et al., "ViViT: A Video Vision Transformer", 2021 IEEE/CVF International Conference on Computer Vision, Montreal, Quebec, Canada, Oct. 10-17, 2021, pp. 6836-6846.
Ba et al., "Layer Normalization", arXiv:1607.06450v1, Jul. 21, 2016, 14 pages.
Bello et al., "Attention Augmented Convolutional Networks", 2019 IEEE/CVF International Conference on Computer Vision, Seoul, South Korea, Oct. 27-Nov. 2, 2019, pp. 3286-3295.

(Continued)

*Primary Examiner* — Leon Flores
(74) *Attorney, Agent, or Firm* — DORITY & MANNING P.A.

(57) ABSTRACT

Provided is an efficient and scalable attention model that can be referred to as multi-axis attention. Example implementations can include two aspects: blocked local and dilated global attention. These design choices allow global-local spatial interactions on arbitrary input resolutions with only linear complexity. The present disclosure also presents a new architectural element by effectively blending the proposed multi-axis attention model with convolutions. In addition, the present disclosure proposes a simple hierarchical vision backbone, example implementations of which can be referred to as MaxViT, by simply repeating the basic building block over multiple stages. Notably, MaxViT is able to "see" globally throughout the entire network, even in earlier, high-resolution stages.

20 Claims, 7 Drawing Sheets

(56) References Cited

OTHER PUBLICATIONS

Bello et al., "Revisiting ResNets: Improved Training and Scaling Strategies", Thirty-Fifth International Conference on Neural Information Processing Systems, Online, Dec. 6-14, 2021, 14 pages.
Brock et al., "High-performance large-scale image recognition without normalization", arXiv:2102.0617v1, Feb. 11, 2021, 22 pages.
Carion et al., "End to-End Object Detection with Transformers", arXiv:2005.12872v3, May 28, 2020, 26 pages.
Chen et al. "DeepLab: Semantic Image Segmentation with Deep Convolutional Nets, Atrous Convolution, and Fully Connected CRFs", arXiv:1606.00915v2, May 12, 2017, 14 pages.
Chen et al., "A Simple Single-Scale Vision Transformer for Object Localization and Instance Segmentation", arXiv:2112.09747v3, Oct. 1, 2022, 23 pages.
Chen et al., "Adaptive Fractional Dilated Convolution Network for Image Aesthetics Assessment", 2020 IEEE/CVF Conference on Computer Vision and Pattern Recognition, Seattle, Washington, United States, Jun. 13-19, 2020, 10 pages.
Chen et al., "Hybrid Task Cascade for Instance Segmentation", 2019 IEEE/CVF Conference on Computer Vision and Pattern Recognition, Long Beach, California, United States, Jun. 15-19, 2019, 10 pages.
Chen et al., "Learning Multiple Adverse Weather Removal via Two-Stage Knowledge Learning and Multi-Contrastive Regularization: Toward a Unified Model", 2022 IEEE/CVF Conference on Computer Vision and Pattern Recognition, New Orleans, Louisiana, United States, Jun. 18-24, 2022, pp. 17653-17662.
Chen et al., "On Self Modulation for Generative Adversarial Networks", arXiv:1810.01365v2, May 2, 2019, 18 pages.
Chen et al., "ProxIQA: A Proxy Approach to Perceptual Optimization of Learned Image Compression", arXiv:1910.08845v2, Oct. 29, 2020, 13 pages.
Chen et al., "Self-Supervised GANs via Auxiliary Rotation Loss", 2019 IEEE/CVF Conference on Computer Vision and Pattern Recognition, Long Beach, California, United States, Jun. 15-19, 2019, pp. 12154-12163.
Chen, W., Huang, W., Du, X., Song, X., Wang, Z., Zhou, D.: Auto-scaling vision transformers without training. arXiv preprint arXiv:2202.11921 (2022.
Chu et al., "Conditional Positional Encodings for Vision Transformers", arXiv:2102.10882v3, Feb. 13, 2023, 19 pages.
Chu et al., "Twins: Revisiting the Design of Spatial Attention in Vision Transformers", Thirty-Fifth International Conference on Neural Information Processing Systems, Virtual, Dec. 6-14, 2021, pp. 9355-9366.
Coates et al. "An Analysis of Single-Layer Networks in Unsupervised Feature Learning", Fourteenth International Conference on Artificial Intelligence and Statistics, Fort Lauderdale, Florida, United States, Apr. 11-13, 2011, pp. 215-223.
D'Ascoli et al., "ConViT: Improving Vision Transformers with Soft Convolutional Inductive Biases", Thirty-Eighth International Conference on Machine Learning, Virtual, Jul. 18-24, 2021, 11 pages.
Dai et al., "CoAtNet: Marrying Convolution and Attention for all Data Sizes", Thirty-Fifth International Conference on Neural Information Processing Systems, Virtual, Dec. 6-14, 2021, pp. 3965-3977.
Devlin et al., "BERT: Pre-Training of Deep Bidirectional Transformers for Language Understanding", arXiv:1810.04805v2, May 24, 2019, 16 pages.
Dong et al., "CSWin Transformer: A General Vision Transformer Backbone with Cross-Shaped Windows", arXiv:2107.00652v3, Jan. 9, 2022, 13 pages.
Dosovitskiy et al., "An Image is Worth 16×16 Words: Transformers for Image Recognition at Scale", arXiv:2010.11929v2, Jun. 3, 2021, 22 pages.
Fan et al., "Multiscale Vision Transformers", 2021 IEEE/CVF International Conference on Computer Vision, Montreal, Quebec, Canada, Oct. 10-17, 2021, pp. 6824-6835.

Fang et al., "Instaboost: Boosting Instance Segmentation via Probability Map Guided Copy-pasting", 2019 IEEE/CVF International Conference on Computer Vision, Seoul, South Korea, Oct. 27-Nov. 2, 2019, pp. 682-691.
Goodfellow et al., "Generative Adversarial Nets", Twenty-Eighth International Conference on Neural Information Processing Systems, Montreal, Canada, Dec. 8-13, 2014, 9 pages.
Han et al., "Transformer in Transformer", Thirty-Fifth International Conference on Neural Information Processing Systems, Virtual, Dec. 6-14, 2021, 12 pages.
He et al., "Deep Residual Learning for Image Recognition", 2016 Institute of Electrical and Electronics Engineers Conference on Computer Vision and Pattern Recognition, Las Vegas, Nevada, United States, Jun. 27-30, 2016, pp. 770-778.
He et al., "Identity Mappings in Deep Residual Networks", Fourteenth European Conference on Computer Vision, Amsterdam, The Netherlands, Oct. 11-14, 2016, pp. 630-645.
He et al., "Mask R-CNN", arXiv:1703.06870v3, Jan. 24, 2018, 12 pages.
Hendrycks et al., Gaussian Error Linear Units (GELUs), arXiv:1606.08415v5, Jun. 6, 2023, 10 pages.
Heusel et al., "GANs Trained by a Two Time-Scale Update Rule Converge to a Local Nash Equilibrium", Thirty-First International Conference on Neural Information Processing Systems, Long Beach, California, United States, Dec. 4-9, 2017, pp. 6629-6640.
Ho et al., "Axial Attention in Multidimensional Transformers", arXiv:1912.12180v1, Dec. 20, 2019, 11 pages.
Hoang et al., "MGAN: Training Generative Adversarial Nets with Multiple Generators", Sixth International Conference on Learning Representations, Vancouver, Canada, Apr. 20-May 8, 2018, 24 pages.
Howard et al., "MobileNets: Efficient Convolutional Neural Networks for Mobile Vision Applications", arXiv:1704.04861v1, Apr. 17, 2017, 9 pages.
Hu et al., "Squeeze-and-Excitation Networks", 2018 IEEE/CVF Conference on Computer Vision and Pattern Recognition, Salt Lake City, Utah, United States, Jun. 18-23, 2018, pp. 7132-7141.
Huang et al., "Densely Connected Convolutional Networks", 2017 Institute of Electrical and Electronics Engineers Conference on Computer Vision and Pattern Recognition, Honolulu, Hawaii, United States, Jul. 21-26, 2017, pp. 4700-4708.
Hudson et al., "Generative Adversarial Transformers", Thirty-Eighth International Conference on Machine Learning, Virtual, Jul. 18-24, 2021, pp. 4487-4499.
International Preliminary Report on Patentability for PCT/US2023/016952, mailed on Oct. 10, 2024, 12 pages.
Ioffe et al., "Batch Normalization: Accelerating Deep Network Training by Reducing Internal Covariate Shift", arXiv:1502.03167v3, 11 pages.
Jiang et al., "TransGAN: Two Pure Transformers Can Make One Strong GAN, and That Can Scale Up", Thirty-Fifth Conference on Neural Information Processing Systems, Virtual, Dec. 6-14, 2021, 14 pages.
Karras et al., "Analyzing and Improving the Image Quality of StyleGAN", 2020 IEEE/CVF Conference on Computer Vision and Pattern Recognition, Seattle, Washington, United States, Jun. 13-19, 2020, pp. 8110-8119.
Karras et al., "Progressive Growing of GANs for Improved Quality, Stability, and Variation", arXiv:1710.10196v3, Feb. 26, 2018, 26 pages.
Ke et al., "MUSIQ: Multi-Scale Image Quality Transformer", 2021 IEEE/CVF International Conference on Computer Vision, Montreal, Quebec, Canada, Oct. 10-17, 2021, pp. 5148-5157.
Khan et al., "Transformers in Vision: A Survey", arXiv:2101.01169v5, Jan. 19, 2022, 30 pages.
Kingma et al., "Adam: A Method for Stochastic Optimization", arXiv:1412.6980v9, Jan. 30, 2017, 15 pages.
Kolesnikov et al., "Big Transfer (BiT): General Visual Representation Learning", Sixteenth European Conference on Computer Vision, Glasgow, United Kingdom, Aug. 23-28, 2020, pp. 491-507.

(56) References Cited

OTHER PUBLICATIONS

Krizhevsky et al., "ImageNet Classification with Deep Convolutional Neural Networks", Twenty-Sixth International Conference on Neural Information Processing Systems, Lake Tahoe, Nevada, United States, Dec. 3-6, 2012, 9 pages.
Krizhevsky et al., "Learning Multiple Layers of Features from Tiny Images", University of Toronto, 2009, 60 pages.
Lan et al., "ALBERT: A Lite BERT for Self-Supervised Learning of Language Representations", arXiv:1909.11942v6, Feb. 9, 2020, 17 pages.
Li et al., "COMISR: Compression-Informed Video Super-Resolution", 2021 IEEE/CVF International Conference on Computer Vision, Montreal, Quebec, Canada, Oct. 10-17, 2021, pp. 2543-2552.
Li et al., "LocalViT: Analyzing Locality in Vision Transformers", arXiv:2104.05707v2, Feb. 12, 2025, 8 pages.
Lin et al., "Feature Pyramid Networks for Object Detection", 2017 Institute of Electrical and Electronics Engineers Conference on Computer Vision and Pattern Recognition, Honolulu, Hawaii, United States, Jul. 21-26, 2017, 9 pages.
Lin et al., "Microsoft COCO: Common Objects in Context", Thirteenth European Conference on Computer Vision, Zurich, Switzerland, Sep. 6-12, 2014, pp. 740-755.
Lin et al., "PacGAN: The Power of Two Samples in Generative Adversarial Networks", Thirty-Second Conference on Neural Information Processing Systems, Montreal, Canada, Dec. 3-8, 2018, 10 pages.
Liu et al., "A ConvNet for the 2020s", arXiv:2201.03545v2, Mar. 2, 2022, 15 pages.
Liu et al., "Diverse Image Generation via Self-Conditioned GANs", 2020 IEEE/CVF Conference on Computer Vision and Pattern Recognition, Seattle, Washington, United States, Jun. 13-19, 2020, pp. 14286-14295.
Liu et al., "Swin Transformer: Hierarchical Vision Transformer using Shifted Windows", 2021 IEEE/CVF International Conference on Computer Vision, Montreal, Quebec, Canada, Oct. 10-17, 2021, pp. 10012-10022.
Long et al., "Fully Convolutional Networks for Semantic Segmentation", 2015 Institute of Electrical and Electronics Engineers Conference on Computer Vision and Pattern Recognition, Boston, Massachusetts, United States, Jun. 7-12, 2015, pp. 3431-3440.
Loshchilov et al., "Decoupled Weight Decay Regularization", arXiv:1711.05101v3, Jan. 4, 2019, 19 pages.
Mescheder et al., "Which Training Methods for GANs Do Actually Converge?", arXiv:1801.04406v4, Jul. 31, 2018, 39 pages.
Murray et al., "AVA: A Large-Scale Database for Aesthetic Visual Analysis", 2012 Institute of Electrical and Electronics Engineers Conference on Computer Vision and Pattern Recognition, Jun. 16-21, 2012, Providence, Rhode Island, United States, 8 pages.
Radosavovic et al., Designing Network Design Space, 2020 IEEE/CVF Conference on Computer Vision and Pattern Recognition, Jun. 13-19, 2020, Seattle, Washington, United States, pp. 10428-10436.
Raffel et al., "Exploring the Limits of Transfer Learning with A Unified Text-To-Text Transformer", arXiv:1910.10683v4, Sep. 19, 2023, 67 pages.
Rao et al., "Efficient Vision Transformers with Dynamic Token Sparsification", Thirty-fifth Conference on Neural Information Processing Systems, (NeurIPS 202), Dec. 6-14, 2021, 13 pages.
Ren et al., "Faster R-CNN: Towards Real-Time Object Detection with Region Proposal Networks", Institute of Electrical and Electronics Engineers Transactions on Pattern Analysis and Machine Intelligence, Jun. 6, 2016, 9 pages.
Rogozhnikov et al., "EINOPS: Clear and Reliable Tensor Manipulations with Einstein Like Notation", International Conference on Learning Representations, Virtual, Apr. 25-29, 2022, 9 pages.
Ronneberger et al., "U-net: Convolutional Networks for Biomedical Image Segmentation", International Conference on Medical Image Computing and Computer-Assisted Intervention, Munich, Germany, Oct. 5-9, 2015, pp. 234-241.
Sage et al., "Logo Synthesis and Manipulation with Clustered Generative Adversarial Networks", Institute of Electrical and Electronics Engineers Conference on Computer Vision and Pattern Recognition, 2018, pp. 5879-5888.
Salimans et al., "Improved Techniques for Training GANs", Thirtieth Conference on Neural Information Processing Systems (NIPS 2016), Barcelona, Spain, Dec. 5-10, 2016, 9 pages.
Sandler et al., "MobileNetV2: Inverted Residuals and Linear Bottlenecks", 2018 IEEE/CVF Conference on Computer Vision and Pattern Recognition, Jan. 13, 2018, 11 pages.
Shaw et al., "Self-attention with Relative Position Representations", arXiv:1803.02155, Apr. 12, 2018, 5 pages.
Shi et al., "Real-time Single Image and Video Super-Resolution Using an Efficient Sub-Pixel Convolutional Neural Network", Sep. 2016, 10 pages.
Sun et al., "Revisiting Unreasonable Effectiveness of Data in Deep Learning Era", 2017 Institute of Electrical and Electronics Engineers International Conference on Computer Vision, Venice, Italy, Oct. 22-29, 2017, 10 pages.
Szegedy et al., "Going Deeper with Convolutions", Institute of Electrical and Electronics Engineers Conference on Computer Vision and Pattern Recognition, Jun. 7-12, 2015, Boston, Massachusetts, United States, 9 pages.
Szegedy et al., "Inception-v4, Inception-ResNet and the Impact of Residual Connections on Learning", AAAI '17: Thirty-first Association for the Advancement of Artificial Intelligence Conference on Artificial Intelligence, San Francisco, California, United States, Feb. 4-9, 2017, 7 pages.
Szegedy et al., "Rethinking the Inception Architecture for Computer Vision", Institute of Electrical and Electronics Engineers Conference on Computer Vision and Pattern Recognition, Jun. 27-30, 2016, pp. 10 pages.
Talebi et al., "Learning to Resize Images for Computer Vision Tasks", IEEE/CVF International Conference on Computer Vision, Mar. 17, 2021, 10 pages.
Talebi et al., "NIMA: Neural Image Assessment", Institute of Electrical and Electronics Engineers Transactions on Image Processing, vol. 27, No. 8, Aug. 2018, 14 pages.
Tan et al., "EfficientNet: Rethinking Model Scaling for Convolutional Neural Networks", Thirty-sixth International Conference on Machine Learning, Long Beach, California, United States, Jun. 9-15, 2019, 10 pages.
Tan et al., "EfficientNetV2: Smaller Models and Faster Training", arXiv:2104.00298v3, Jun. 23, 2021, 11 pages.
Touvron et al., "Going Deeper with Image Transformers", 2021 IEEE/CVF International Conference on Computer Vision (ICCV), Montreal, Quebec, Canada, Oct. 10-17, 2021, 11 pages.
Touvron et al., "Training Data-efficient Image Transformers & Distillation Through Attention", Jan. 15, 2021, arXiv:2012.12877v2, 22 pages.
Tu et al., "MAXIM: Multi-Axis MLP for Image Processing", arXiv:2201.02973, Apr. 1, 2022, 34 pages.
Tu et al., "MaxViT: Multi-Axis Vision Transformer", arXiv:2204.01697v4, Sep. 9, 2022, 31 pages.
Vaswani et al., "Attention Is All You Need", Thirty-first Conference on Neural Information Processing Systems, NIPS 2017, Long Beach, California, United States, 11 pages.
Vaswani et al., "Scaling Local Self-Attention For Parameter Efficient Visual Backbones", IEEE/CVF Conference on Computer Vision and Pattern Recognition, Mar. 23, 2021, 11 pages.
Wang et al., "Axial-DeepLab: Stand-Alone Axial-Attention for Panoptic Segmentation", Sixteenth European Conference on Computer Vision, Glasgow, United Kingdom, Aug. 23-28, 2020, 19 pages.
Wang et al., "Non-Local Neural Networks", 2018 IEEE/CVF Conference on Computer Vision and Pattern Recognition, Salt Lake City, Utah, United States, Jun. 18-23, 2018, pp. 7794-7803.
Wang et al., "Pyramid Vision Transformer: A Versatile Backbone for Dense Prediction Without Convolutions", 2021 IEEE/CVF International Conference on Computer Vision, Virtual, Oct. 11-17, 2021, pp. 568-578.

(56) References Cited

OTHER PUBLICATIONS

Wang et al., "Rich Features for Perceptual Quality Assessment of UGC Videos", 2021 IEEE/CVF International Conference on Computer Vision, Virtual, Oct. 11-17, 2021, 10 pages.

Whang et al., "Deblurring via Stochastic Refinement", 2022 IEEE/CVF Conference on Computer Vision and Pattern Recognition, New Orleans, Louisiana, United States, Jun. 18-24, 2022, 11 pages.

Woo et al., "CBAM: Convolutional Block Attention Module", Fifteenth European Conference on Computer Vision, Munich, Germany, Sep. 8-14, 2018, 17 pages.

Wu et al., "CvT: Introducing Convolutions to Vision Transformers", 2021 IEEE/CVF International Conference on Computer Vision, Virtual, Oct. 11-17, 2021, pp. 22-31.

Wu et al., "Pay Less Attention with Lightweight and Dynamic Convolutions", arXiv:1901.10430v2, Feb. 22, 2019, 14 pages.

Xiao et al., "Early Convolutions Help Transformers See Better", Thirty-fifth International Conference on Neural Information Processing Systems, Online, Dec. 6-14, 2021, 9 pages.

Xie et al., "Aggregated Residual Transformations for Deep Neural Networks", 2017 Institute of Electrical and Electronics Engineers Conference on Computer Vision and Pattern Recognition, Honolulu, Hawaii, United States, Jul. 21-28, 2017, pp. 1492-1500.

Xu et al., "CoBEVT: Cooperative Bird's Eye View Semantic Segmentation with Sparse Transformers", arXiv:2207.02202v2, Sep. 25, 2022, 21 pages.

Xu et al., "Co-Scale Conv-Attentional Image Transformers", 2021 IEEE/CVF International Conference on Computer Vision, Virtual, Oct. 11-17, 2021, pp. 9981-9990.

Xu et al., V2X-ViT: Vehicle-to-Everything Cooperative Perception with Vision Transformer, arXiv:2203.10638v3, Aug. 8, 2022, 31 pages.

Yang et al., "Focal Self-Attention for Local-Global Interactions in Vision Transformers", arXiv:2107.00641v1, Jul. 1, 2021, 21 pages.

Yang et al., "XLNet: Generalized Autoregressive Pretraining for Language Understanding", Thirty-third International Conference on Neural Information Processing Systems, Vancouver, British, Columbia, Canada, Dec. 8-14, 2019, 11 pages.

Yuan et al., "Tokens-to-Token ViT: Training Vision Transformers from Scratch on ImageNet", 2021 IEEE/CVF International Conference on Computer Vision, Virtual, Oct. 11-17, 2021, pp. 558-567.

Zhai et al., "Scaling Vision Transformers", arXiv:2106.04560v2, Jun. 20, 2022, 31 pages.

Zhao et al., "Improved Transformer for High-Resolution GANs", Thirty-fifth International Conference on Neural Information Processing Systems, Online, Dec. 6-14, 2021, 14 pages.

\* cited by examiner

MULTI-AXIS VISION TRANSFORMER

RELATED APPLICATIONS

The present application is a continuation of International Application PCT/US2023/016952 filed Mar. 30, 2023, which claims priority to and the benefit of U.S. Provisional Patent Application No. 63/325,356, filed Mar. 30, 2022. Applicant claims priority to and the benefit of each of such applications and incorporates each of such applications herein by reference in its entirety.

FIELD

The present disclosure relates generally to a more efficient machine learning architecture for vision tasks. More particularly, the present disclosure relates to a multi-axis vision transformer that includes one or more multi-axis blocks that include a local attention axis and a global attention axis in series.

BACKGROUND

Transformers have recently gained significant attention in the computer vision community. However, the lack of scalability of self-attention mechanisms with respect to image size has limited their wide adoption in state-of-the-art vision backbones.

More particularly, convolutional neural networks (ConvNets) have historically been the dominant architectural design choice for computer vision. ConvNets continue to excel on numerous vision problems by going deeper, wider, adding dense connections, efficient separable convolutions, atrous convolutions, using encoder-decoder frameworks, and even introducing modern micro-design components.

Meanwhile, inspired by the evolution of self-attention models like Transformers (Vaswani et al., Attention is all you need. *Advances in Neural Information Processing Systems* 30 (2017)) in natural language processing, numerous researchers have started to introduce attention mechanisms into vision models. As one example, the Vision Transformer (ViT) (Dosovitskiy et al., An image is worth 16×16 words: Transformers for image recognition at scale. *arXiv preprint arXiv:* 2010.11929 (2020)) is perhaps the first fully Transformer-based architecture for vision, whereby image patches are simply regarded as sequences of words and a transformer encoder is applied on these visual tokens. When pre-trained on large-scale datasets, ViT can achieve compelling results on image recognition.

However, it has been observed that without extensive pre-training ViT underperforms on image recognition. This is due to ViT's strong model capacity, that is imbued with less inductive bias, which lead to overfitting. To properly regularize the model capacity and improve its scalability, numerous subsequent efforts have studied sparse Transformer models tailored for vision tasks such as local attention. These methods typically re-introduce hierarchical architectures to compensate for the loss of non-locality. The Swin Transformer (Liu et al., Swin transformer: Hierarchical vision transformer using shifted windows. In: *Proceedings of the IEEE/CVF International Conference on Computer Vision.* pp. 10012-10022 (2021)) is one such successful attempt to modify Transformers by applying self-attention on shifted non-overlapping windows. For the first time, this approach outperformed ConvNets on the ImageNet benchmark with a pure vision Transformer. Despite having more flexibility and generalizability than the full attention used in ViT, window-based attention has been observed to have limited model capacity due to the loss of non-locality, and henceforth scales unfavorably on larger data regimes such as ImageNet-21K and JFT. However, acquiring global interactions via full-attention at early or high-resolution stages in a hierarchical network is computationally heavy, as the attention operator requires quadratic complexity.

Therefore, how to efficiently incorporate global and local interactions to balance the model capacity and generalizability under a computation budget still remains challenging.

SUMMARY

Aspects and advantages of embodiments of the present disclosure will be set forth in part in the following description, or can be learned from the description, or can be learned through practice of the embodiments.

One example aspect of the present disclosure is directed to a computing system for performing computer vision tasks with improved efficiency. The computing system comprising: one or more processors; and one or more non-transitory computer-readable media that collectively store: a machine-learned computer vision model configured to process input image data to generate an output prediction. The machine-learned computer vision model comprises one or more multi-axis self-attention blocks. Each of the one or more multi-axis self-attention blocks comprising: a local processing portion configured to perform a local attention operation on a first set of feature data; and a global processing portion configured to perform a global attention operation on a second set of feature data. The global processing portion and the local processing portion are arranged in a series configuration with respect to one another.

Another example aspect of the present disclosure is directed to a computer-implemented method for performing a computer vision task. The method includes obtaining an input image. The method includes processing the input image with a machine-learned computer vision model to generate an output prediction, wherein processing the input image with the machine-learned computer vision model comprises, at each of one or more multi-axis self-attention blocks of the machine-learned computer vision model. The method includes, at a local processing portion of the multi-axis self-attention block: performing a first partitioning operation to partition a first set of feature data into a plurality of local windows; and performing a respective local attention operation on each of the plurality of local windows. The method includes, at a global processing portion of the multi-axis self-attention block: performing a second partitioning operation to partition a second set of feature data into a plurality of global windows; and performing a respective global attention operation on each of the plurality of global windows. The local processing portion and the global processing portion are arranged in a series configuration with respect to each other. The method includes providing the output prediction as an output.

Another example aspect of the present disclosure is directed to a computing system for performing an image generation task with improved efficiency. The computing system includes one or more processors and one or more non-transitory computer-readable media that collectively store: a machine-learned image generation model configured to process input data to generate an output image. The machine-learned image generation model comprises one or more multi-axis self-attention blocks. Each of the one or more multi-axis self-attention blocks comprising: a global processing portion configured to perform a global attention operation on a second set of feature data; and a local processing portion configured to perform a local attention operation on a first set of feature data. The global processing portion and the local processing portion are arranged in a series configuration with respect to one another.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1B:
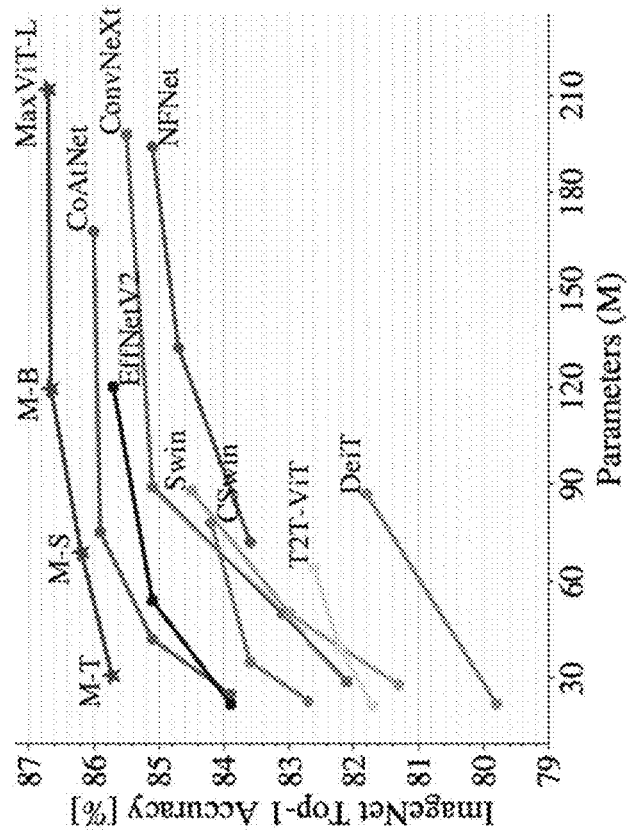
FIGS. 1A-B depict example experimental results for example embodiments of the present disclosure.

Reference numerals that are repeated across plural figures are intended to identify the same features in various implementations.

DETAILED DESCRIPTION

Overview

Generally, the present disclosure is directed to an efficient and scalable attention model that can be referred to as multi-axis attention. Example implementations can include two aspects: blocked local and dilated global attention. These design choices allow global-local spatial interactions on arbitrary input resolutions with only linear complexity. The present disclosure also presents a new architectural element by effectively blending the proposed multi-axis attention model with convolutions. In addition, the present disclosure proposes a simple hierarchical vision backbone, example implementations of which can be referred to as MaxViT, by simply repeating the basic building block over multiple stages. Notably, MaxViT is able to "see" globally throughout the entire network, even in earlier, high-resolution stages.

The effectiveness of example implementations of the proposed model are demonstrated on a broad spectrum of vision tasks. On image classification, MaxViT achieves state-of-the-art performance under various settings: without extra data, MaxViT attains 86.5% ImageNet-1K top-1 accuracy; with ImageNet-21K pre-training, the model achieves 88.7% top-1 accuracy. For downstream tasks, MaxViT as a backbone delivers favorable performance on object detection as well as visual aesthetic assessment. The proposed model also expresses strong generative modeling capability on ImageNet, demonstrating the superior potential of MaxViT blocks as a universal vision module.

More particularly, the present disclosure presents a new type of Transformer module, called multi-axis self-attention (Max-SA), that capably serves as a basic architecture component which can perform both local and global spatial interactions in a single block. Compared to full self-attention, Max-SA enjoys greater flexibility and efficiency, i.e., naturally adaptive to different input lengths with linear complexity; in contrast to (shifted) window/local attention, Max-SA allows for stronger model capacity by proposing a global receptive field. Moreover, with merely linear complexity, Max-SA can be used as a general stand-alone attention module in any layer of a network, even in earlier, high-resolution stages.

To demonstrate its effectiveness and universality, a simple but effective vision backbone is proposed. Example implementations of the backbone can be called Multi-axis Vision Transformer (MaxViT). The backbone can be built by hierarchically stacking repeated blocks composed of Max-SA and convolutions. While the proposed model belongs to the category of hybrid vision Transformers, MaxViT distinguishes from previous approaches in that the model is geared for simplicity, by designing a basic block unifying convolution, local, and global attention, then simply repeating it.

Example experiments show that the MaxViT significantly improves upon state-of-the-art (SOTA) performance under all data regimes for a broad range of visual tasks. Specifically, as FIGS. 1A-B show, MaxViT outperforms all recent Transformer-based models in regard to both accuracy vs. FLOPs and accuracy vs. parameter curves.

Figure 1A:
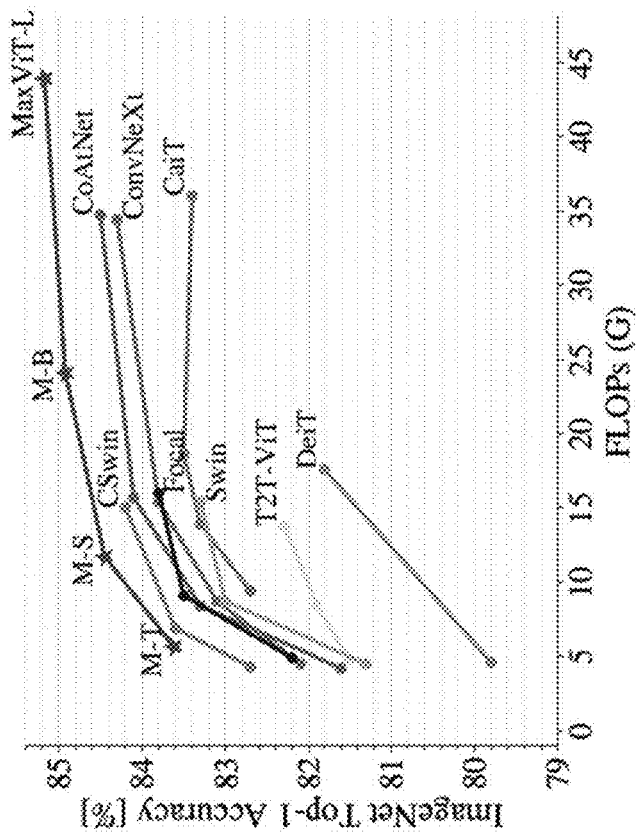

More particularly, FIGS. 1A-B show a performance comparison of MaxViT with state-of-the-art vision Transformers on ImageNet-1K. In particular, FIG. 1A shows Accuracy vs. FLOPs performance scaling curve under ImageNet-1K training setting at input resolution 224×224. FIG. 1B shows Accuracy vs. Parameters scaling curve under ImageNet-1K fine-tuning setting allowing for higher sizes (384/512). Example implementations of the proposed model show superior performance in terms of both accuracy vs. computation and accuracy vs. parameters tradeoff.

Thus, one example aspect of the present disclosure is directed to a generic Transformer architecture, (e.g., "MaxViT"), that can capture both local and global spatial interactions throughout every stage of the network. Another example aspect is directed to a novel stand-alone multi-axis attention module composed of blocked local and dilated global attention, enjoying global perception in linear complexity. Furthermore, extensive experiments show that MaxViT achieves SOTA results under various data regimes for a broad range of tasks including image classification, object detection, image aesthetic assessment, and image generation.

Thus, the present disclosure provides a number of technical effects and benefits. As one example, extensive experiments showed that example implementations of the present disclosure achieve state of the art results on a number of computer vision tasks. Specifically, on image classification, MaxViT achieves state-of-the-art performance under various settings: without extra data, MaxViT attains 86.5% ImageNet-1K top-1 accuracy; with ImageNet-21K pre-training, the model achieves 88.7% top-1 accuracy. For downstream tasks, MaxViT as a backbone delivers favorable performance on object detection as well as visual aesthetic assessment. The proposed model also expresses strong generative modeling capability on ImageNet, demonstrating the superior potential of MaxViT blocks as a universal vision module Thus, the proposed systems and models provide improved computer performance on a significant number of different computer vision tasks. Therefore, the present disclosure represents an improvement in the performance of a computer itself as relates to a specific technical purpose (e.g., computer vision tasks such as image classification, object detection or recognition, etc.).

As another example technical effect and benefit, the model architectures described herein provide superior performance even with fewer parameters and/or FLOPs. Thus, relative to existing approaches, the proposed models can perform the same tasks with superior outcomes while expending fewer computational resources. Therefore, the proposed systems and models conserve computational resources such as processor usage, memory usage, network bandwidth, etc. As such, the proposed techniques correspond to a specific technical implementation that has a design that is motivated by technical considerations of the internal functioning of the computer.

As another example technical effect, as compared to full self-attention, Max-SA enjoys greater flexibility and efficiency, i.e., naturally adaptive to different input lengths with linear complexity; in contrast to (shifted) window/local attention, Max-SA allows for stronger model capacity by proposing a global receptive field. Moreover, with merely linear complexity, Max-SA can be used as a general stand-alone attention module in any layer of a network, even in earlier, high-resolution stages. Thus, the proposed techniques correspond to a specific technical implementation that has a design that is motivated by technical considerations of the internal functioning of the computer.

With reference now to the Figures, example embodiments of the present disclosure will be discussed in further detail.

Example Computer Vision Models

Figure 2:
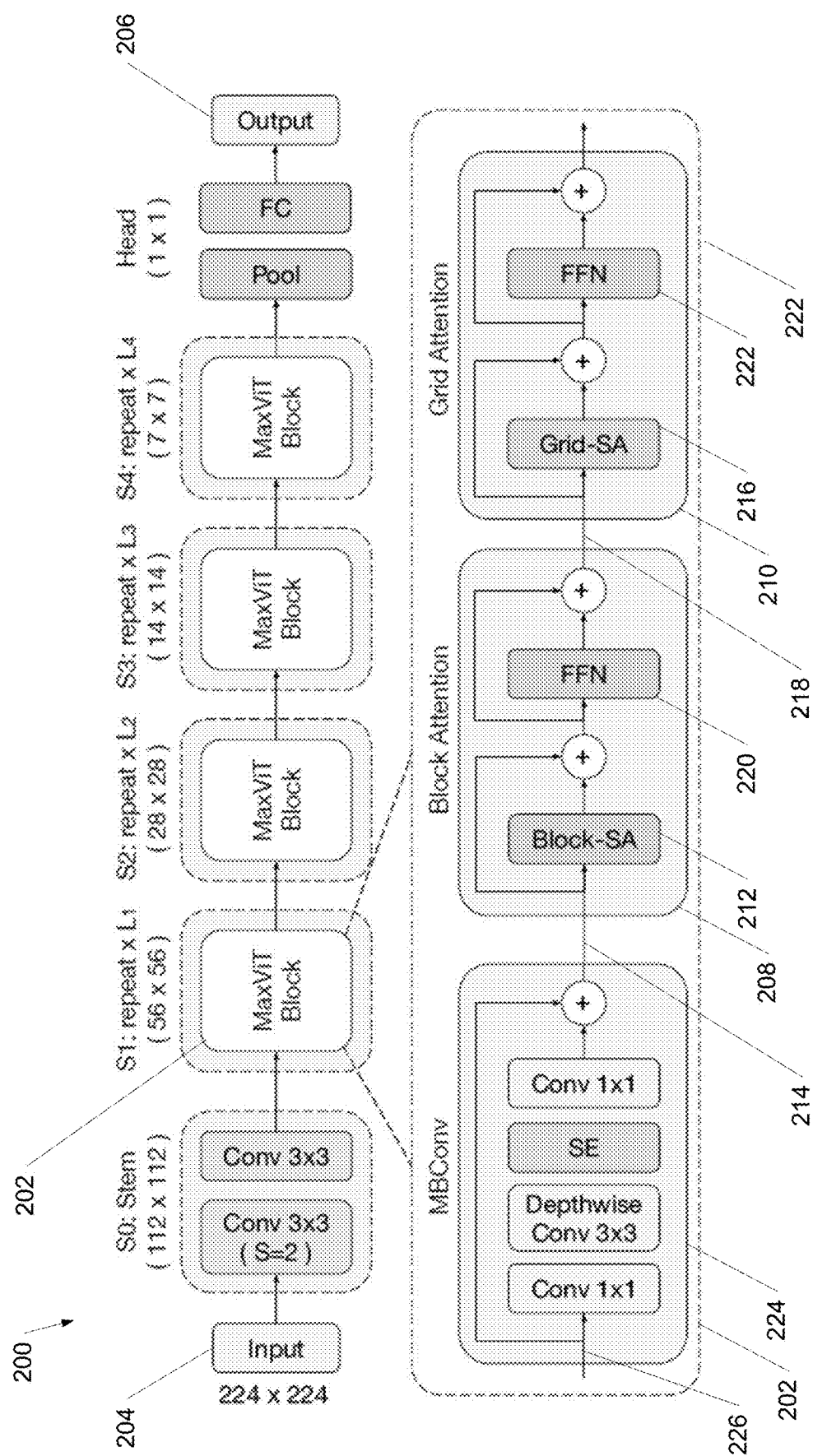
FIG. 2 depicts a graphical diagram of an example network architecture that includes example multi-axis self-attention blocks according to example embodiments of the present disclosure.

Example implementations of the present disclosure include a new type of attention module (examples of which can be referred to as multi-axis self-attention blocks (Max-SA)) by decomposing the fully dense attention mechanisms into two sparse forms—local attention and global attention—which reduces the quadratic complexity of vanilla attention to linear, without any loss of non-locality. Because of the flexibility and scalability of Max-SA, the block is able to contribute to a vision backbone (examples of which can be called MaxViT) by simply stacking alternative layers of Max-SA with convolutional operators in a hierarchical architecture, one example of which is shown in FIG. 2. In some implementations, the convolutional operators can include an inverted linear bottleneck layer with depth-wise separable convolution. One example convolutional block of this type is the MBConv block from Howard et al. Mobilenets: Efficient convolutional neural networks for mobile vision applications. *arXiv preprint arXiv:* 1704.04861. However, other convolutional operators, layers, or blocks can be used additionally or alternatively. MaxViT benefits from global and local receptive fields throughout the entire network, from shallow to deep stages, demonstrating superior performance in regard to both model capacity and generalization abilities.

Example Attention Mechanism

Self-attention allows for spatial mixing of entire spatial (or sequence) locations while also benefiting from content-dependent weights based on normalized pair-wise similarity. The standard self-attention defined in Dosovitskiy et al., and Vaswani et al. (full citation above) is location-unaware, i.e., non-translation equivariant, and therefore does not benefit from an important inductive bias that is typically imbued in ConvNets. Relative self-attention has been proposed to improve on vanilla attention by introducing a relative learned bias added to the attention weights, which has been shown to consistently outperform original attention on many vision tasks. In this work, some example implementations can use the pre-normalized relative self-attention defined in Dai et al. as the key attention operator in MaxViT. See Dai et al., Coatnet: Marrying convolution and attention for all data sizes. *Advances in Neural Information Processing Systems* 34 (2021).

Example Multi-axis Attention

Global interaction is one of the key advantages of self-attention as compared to local convolution. However, directly applying attention along the entire space is typically computationally infeasible as the attention operator requires quadratic complexity. To tackle this problem, the present disclosure provides a multi-axis approach to decompose the full-size attention into two sparse forms—local and global—by simply de-composing the spatial axes.

Let $X \in \mathbb{R}^{H \times W \times C}$ be an input feature map. Instead of applying attention on the flattened spatial dimension HW, a local attention portion can block the feature into a tensor of shape $$\left(\frac{H}{P} \times \frac{W}{P}, P \times P, C\right),$$

representing partitioning into non-overlapping windows, each of size P×P. Applying self-attention on the local spatial dimension i.e., P×P, is equivalent to attending within a small window. This block attention can be used to conduct local interactions.

Despite bypassing the notoriously heavy computation of full self-attention, local-attention models have been observed to underfit on huge-scale datasets. Inspired by block attention, example implementations can leverage a surprisingly simple but effective way to gain sparse global attention, which can be referred to as grid attention. Instead of partitioning feature maps using fixed window size, a global attention portion can grid the tensor into the shape $$\left(G \times G, \frac{H}{G} \times \frac{W}{G}, C\right)$$

using a fixed G×G uniform grid, resulting in windows having adaptive size $$\frac{H}{G} \times \frac{W}{G}.$$

Employing self-attention on the decomposed grid axis i.e., G×G, corresponds to dilated, global spatial mixing of tokens.

By using the same fixed window and grid sizes (e.g., one example is P=G=7), some example implementations can fully balance the computation between local and global operations, both having only linear complexity with respect to spatial size or sequence length.

Note that the example proposed Max-SA module can be a drop-in replacement of the Swin attention module with exactly the same number of parameters and FLOPs. Yet it enjoys global interaction capability without requiring masking, padding, or cyclic-shifting, making it more implementation friendly, preferable to the shifted window scheme. For instance, the multi-axis attention can be easily implemented with einops (Rogozhnikov, A.: Einops: Clear and reliable tensor manipulations with einstein-like notation. In: *International Conference on Learning Representations* (2022)) without modifying the original attention operation.

Figure 3:
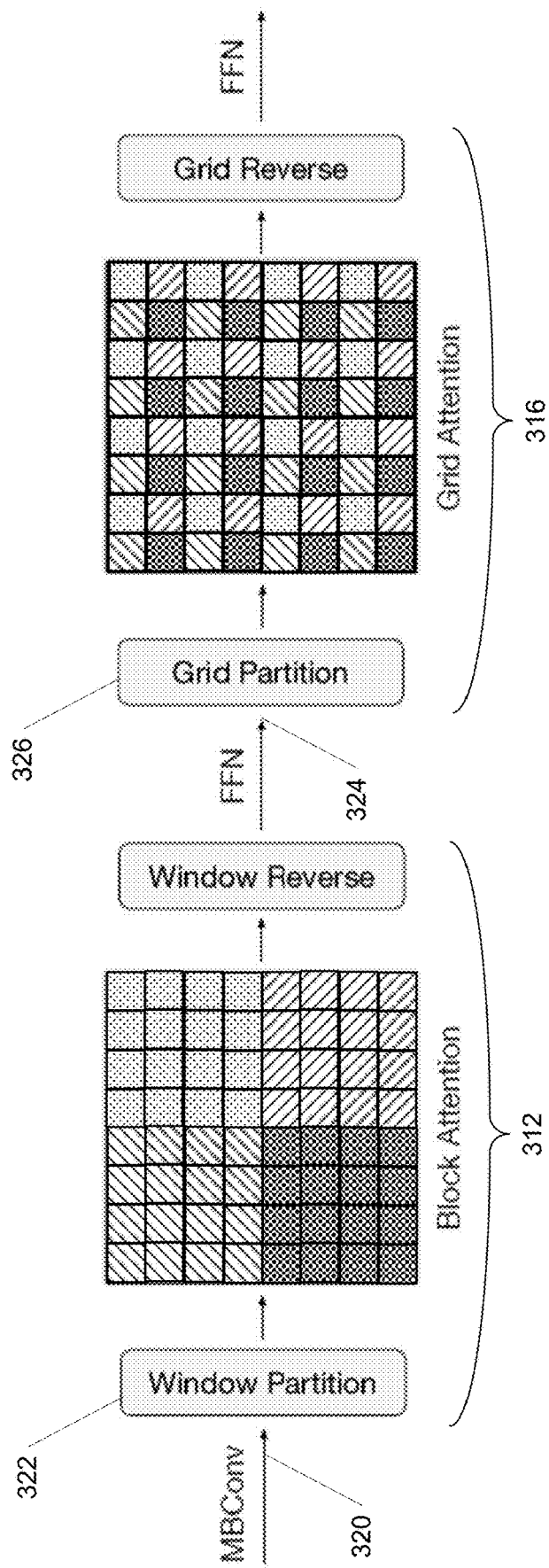
FIG. 3 depicts a graphical diagram of example portions of an example multi-axis self-attention block according to example embodiments of the present disclosure.

In some example implementations, the two types of attentions can be stacked in a series configuration to gain both local and global interactions in a single block, as shown in FIG. 3. Some example implementations also a convolutional block (e.g., a MBConv block) prior to the multi-axis attention, as using MBConv together with attention further increases the generalization as well as the trainability of the network. Using convolutional layers (e.g., MB-Conv layers) prior to attention offers another advantage, in that Depthwise convolutions can be regarded as conditional position encoding (CPE), making the proposed model free of explicit positional encoding layers.

Note that the proposed stand-alone multi-axis attention may be used together or in isolation for different purposes-block attention for local interaction, and grid attention for global mixing. These elements can be easily plugged into many vision architectures, especially on high-resolution tasks that can benefit by global interactions with affordable computation.

Example Architecture Variants

Another example aspect of the present disclosure is directed to a series of simple architectural variants that explore and demonstrate the effectiveness of the proposed multi-axis self-attention block, as shown in FIG. 2. Some example architectures use a hierarchical backbone similar to common ConvNet practices where the input is first down-sampled using Conv3×3 layers in stem stage (S0). The body of the example network contains four stages (S1-S4), with each stage having half the resolution of the previous one with a doubled number of channels (hidden dimension). In the example network shown in FIG. 2, identical MaxViT blocks are employed throughout the entire backbone. Down-sampling can be applied in the Depthwise Conv3×3 layer of the first MBConv block in each stage. The expansion and shrink rates for inverted bottleneck and squeeze-excitation (SE) are 4 and 0.25 as default examples; other values can be used. The attention head size can be set, for example, to 32 for all attention blocks. The example model can be scaled up by increasing block numbers per stage B and the channel dimension C. The architectural configurations of four example MaxViT variants are summarized in Table 1 shown below:

TABLE 1

Detailed architectural specifications for MaxViT families.

| | dsp. rate (out size) | MaxViT-T | | MaxViT-S | |
|---|---|---|---|---|---|
| stem | 2× | 3 × 3, 64, stride 2 | | 3 × 3, 64, stride 2 | |
| | (112 × 112) | 3 × 3, 64, stride 1 | | 3 × 3, 64, stride 1 | |
| S1 | 4× | MBConv, 64, E 4, R 4 | | MBConv, 96, E 4, R 4 | |
| | (56 × 56) | Rel-MSA, P 7 × 7, H 2 | ×2 | Rel-MSA, P 7 × 7, H 3 | ×2 |
| | | Rel-MSA, G 7 × 7, H 2 | | Rel-MSA, G 7 × 7, H 3 | |
| S2 | 8× | MBConv, 128, E 4, R 4 | | MBConv, 192, E 4, R 4 | |
| | (28 × 28) | Rel-MSA, P 7 × 7, H 4 | ×2 | Rel-MSA, P 7 × 7, H 6 | ×2 |
| | | Rel-MSA, G 7 × 7, H 4 | | Rel-MSA, G 7 × 7, H 6 | |
| S3 | 16× | MBConv, 256, E 4, R 4 | | MBConv, 384, E 4, R 4 | |
| | (14 × 14) | Rel-MSA, P 7 × 7, H 8 | ×5 | Rel-MSA, P 7 × 7, H 12 | ×5 |
| | | Rel-MSA, G 7 × 7, H 8 | | Rel-MSA, G 7 × 7, H 12 | |
| S4 | 32× | MBConv, 512, E 4, R 4 | | MBConv, 768, E 4, R 4 | |
| | (7 × 7) | Rel-MSA, P 7 × 7, H 16 | ×2 | Rel-MSA, P 7 × 7, H 24 | ×2 |
| | | Rel-MSA, G 7 × 7, H 16 | | Rel-MSA, G 7 × 7, H 24 | |
| | dsp. rate (out size) | MaxViT-B | | MaxViT-L | |
| stem | 2× | 3 × 3, 64, stride 2 | | 3 × 3, 128, stride 2 | |
| | (112 × 112) | 3 × 3, 64, stride 1 | | 3 × 3, 128, stride 1 | |
| S1 | 4× | MBConv, 96, E 4, R 4 | | MBConv, 128, E 4, R 4 | |
| | (56 × 56) | Rel-MSA, P 7 × 7, H 3 | ×2 | Rel-MSA, P 7 × 7, H 4 | ×2 |
| | | Rel-MSA, G 7 × 7, H 3 | | Rel-MSA, G 7 × 7, H 4 | |
| S2 | 8× | MBConv, 192, E 4, R 4 | | MBConv, 256, E 4, R 4 | |
| | (28 × 28) | Rel-MSA, P 7 × 7, H 6 | ×6 | Rel-MSA, P 7 × 7, H 8 | ×6 |
| | | Rel-MSA, G 7 × 7, H 6 | | Rel-MSA, G 7 × 7, H 8 | |
| | 16× | MBConv, 384, E 4, R 4 | | MBConv, 512, E 4, R 4 | |
| | (14 × 14) | Rel-MSA, P 7 × 7, H 12 | ×14 | Rel-MSA, P 7 × 7, H 16 | ×14 |
| | | Rel-MSA, G 7 × 7, H 12 | | Rel-MSA, G 7 × 7, H 16 | |

TABLE 1-continued

Detailed architectural specifications for MaxViT families.

| S4 | 32× (7 × 7) | MBConv, 768, E 4, R 4<br>Rel-MSA, P 7 × 7, H 24<br>Rel-MSA, G 7 × 7, H 24 | ×2 | MBConv, 1024, E 4, R 4<br>Rel-MSA, P 7 × 7, H 32<br>Rel-MSA, G 7 × 7, H 32 | ×2 |

Example Model Visualizations

As introduced above, FIG. 2 depicts a graphical diagram of an example computer vision model 200 that includes a plurality of example multi-axis self-attention blocks 202 according to example embodiments of the present disclosure. Although multiple multi-axis self-attention blocks 202 are shown in the example illustrated model 200, other model architectures according to present disclosure may include fewer (e.g., one or more) multi-axis self-attention blocks 202. The computer vision model 200 can process an input image 204 to generate an output prediction 206.

According to an aspect of the present disclosure, each of the one or more multi-axis self-attention blocks 202 can include a local processing portion 208 and a global processing portion 210. The local processing portion 208 can be configured to perform a local attention operation 212 on a first set of feature data (e.g., the feature data at location 214). The global processing portion 210 configured to perform a global attention operation 216 on a second set of feature data (e.g., the feature data at location 218).

In some implementations, as illustrated in FIG. 2, the global processing portion 210 and the local processing portion 208 are arranged in a series configuration with respect to one another. As one example, as illustrated in FIG. 2, the local processing portion 208 can be positioned prior to the global processing portion 210 (i.e., in terms of data flow). However, in other implementations, the global processing portion 210 may be positioned prior (i.e., in terms of data flow) to the local processing portion 208.

In some implementations, as illustrated in FIG. 2, the local processing portion 208 can include a first feed-forward network 220 following the local attention operation 212 and the global processing portion 210 can include a second feed-forward neural network 222 following the global attention operation 216.

Referring now to FIG. 3, FIG. 3 depicts a graphical diagram of example portions of an example multi-axis self-attention block according to example embodiments of the present disclosure. In particular, FIG. 3 illustrates an example local attention operation 312 and an example global attention operation 316.

A local attention portion can be configured to perform the local attention operation 312 on a first set of feature data (e.g., the data at location 320) by partitioning 322 the first set of feature data 320 into a plurality of local windows. For example, as shown in FIG. 3, the partitioning 322 has created four local windows each having a size of 4×4. The local attention operation 312 can include performing self-attention individually on each of the plurality of local windows. In some implementations, each of the plurality of local windows has a predefined window size. In other implementations, the number of local windows may be predefined, and the size of the windows is adaptive. In some implementations, the plurality of local windows may be non-overlapping. In other implementations, the plurality of local windows may be overlapping.

In some implementations, a global attention portion can be configured to perform the global attention operation 316 on a second set of feature data (e.g., the data at location 324) by partitioning 326 the second set of feature data 324 into a plurality of global windows based on a grid pattern. For example, the partitioning 326 has resulted in four global windows, where each global window has the defined grid pattern and includes a number of non-adjacent feature values. As one example, the grid pattern can be a fixed uniform grid such that a size of each of the plurality of global windows is adaptive. The global attention operation 316 can then include performing self-attention individually on each of the plurality of global windows.

Referring now back to FIG. 2, in some implementations, the multi-axis self-attention block 202 can include a convolutional portion 224 configured to perform a convolutional operation on a third set of feature data (e.g., the feature data at location 226). As an example, the convolutional portion 224 can be positioned prior (i.e., in terms of data flow) to the local processing portion 208 and the global processing portion 210. In some implementations, the convolutional portion 224 can include an inverted linear bottleneck layer with depth-wise separable convolution and squeeze and excite layers.

As illustrated in FIG. 2, the example computer vision model 200 can include a plurality of multi-axis self-attention blocks 202. For example, the plurality of multi-axis self-attention blocks can be arranged in a sequence one after the other (e.g., to form a "backbone").

As discussed, the model 200 can process an image input 204 to generate an output prediction 206. As examples, the output prediction 206 can be an image classification prediction, an image recognition prediction, an object recognition prediction, and/or various other computer vision task outputs.

In other implementations, a model as described herein can be used to perform an image generation task. As one example, FIG. 4 depicts a graphical diagram of an example network architecture that includes example multi-axis self-attention blocks according to example embodiments of the present disclosure.

Figure 4:
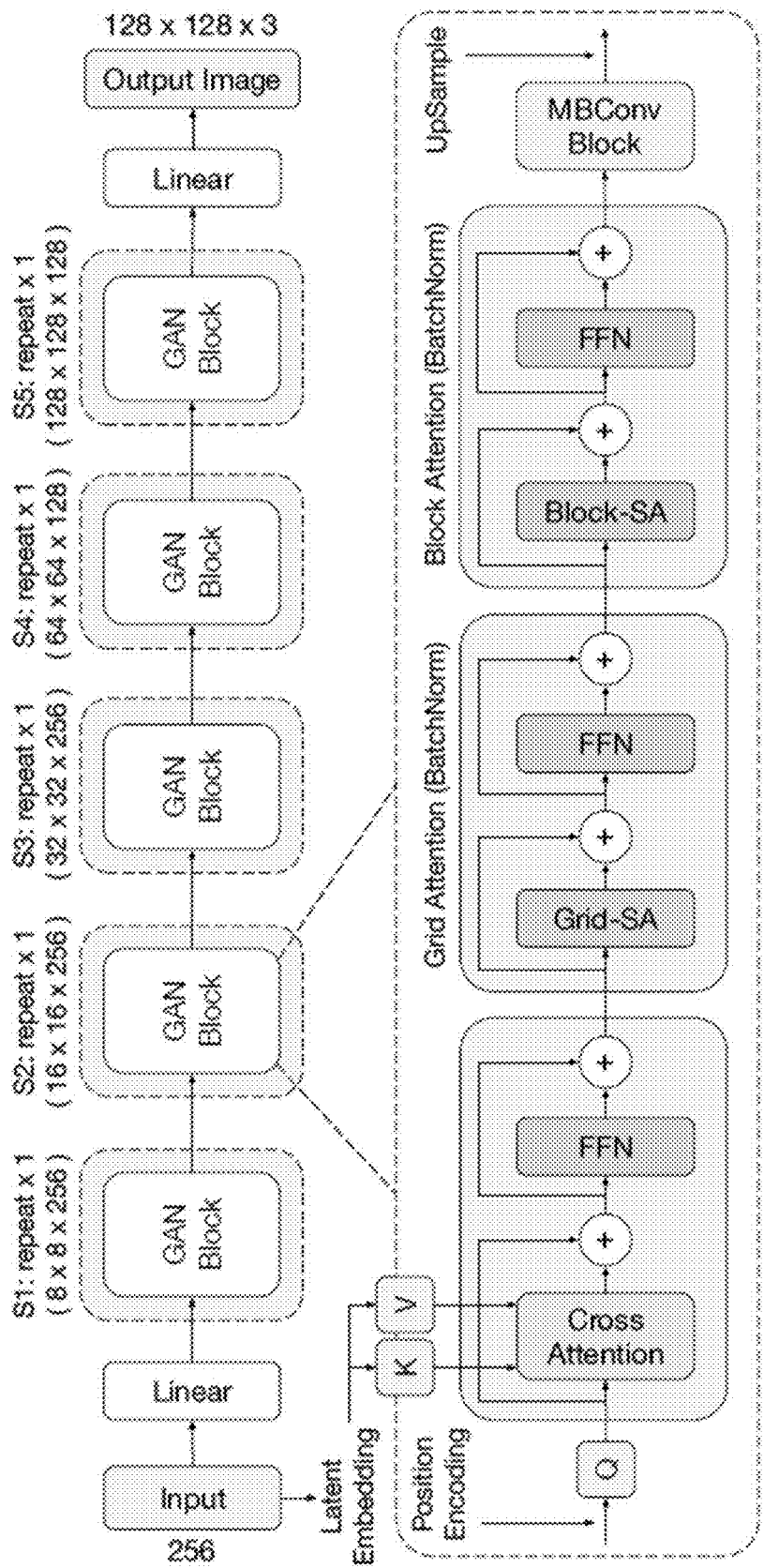
FIG. 4 depicts a graphical diagram of an example network architecture that includes example multi-axis self-attention blocks according to example embodiments of the present disclosure.

As illustrated in FIG. 4, the model can receive an input (e.g., a latent embedding) and, in response, generate an output image. The model can include a number of GAN blocks that each contain a global attention portion and a local attention portion. For example, the global attention portion can be arranged prior to the local attention portion in a series configuration. In some implementations, each GAN block can further include a convolutional block (e.g., MBConv Block) following the local attention portion.

More specifically, as shown FIG. 4, in every stage, the model can include and use a cross-attention module to let the features attend to the latent embedding projected from the input code, which can then be fed into a proposed MaxViT block that comprises grid attention, block attention, and MBConv layer. Note that unlike the example model shown in FIG. 2, in FIG. 4, the order of applying the three layers are reversed: from global to local.

Example Devices and Systems

Figure 5A:
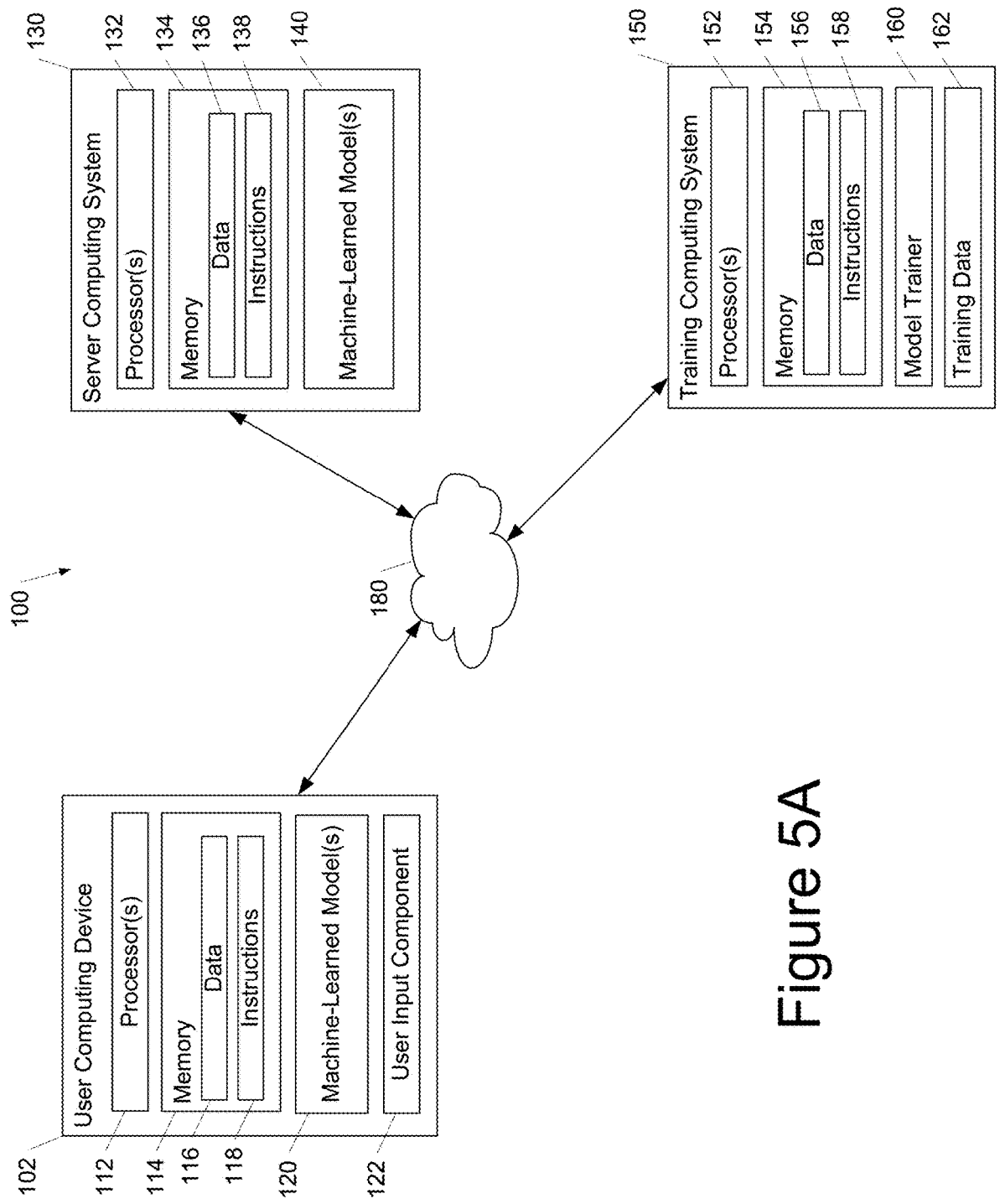
FIG. 5A depicts a block diagram of an example computing system according to example embodiments of the present disclosure.

FIG. 5A depicts a block diagram of an example computing system 100 that performs computer vision tasks according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel vision tasks across multiple instances of imagery).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a computer vision service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
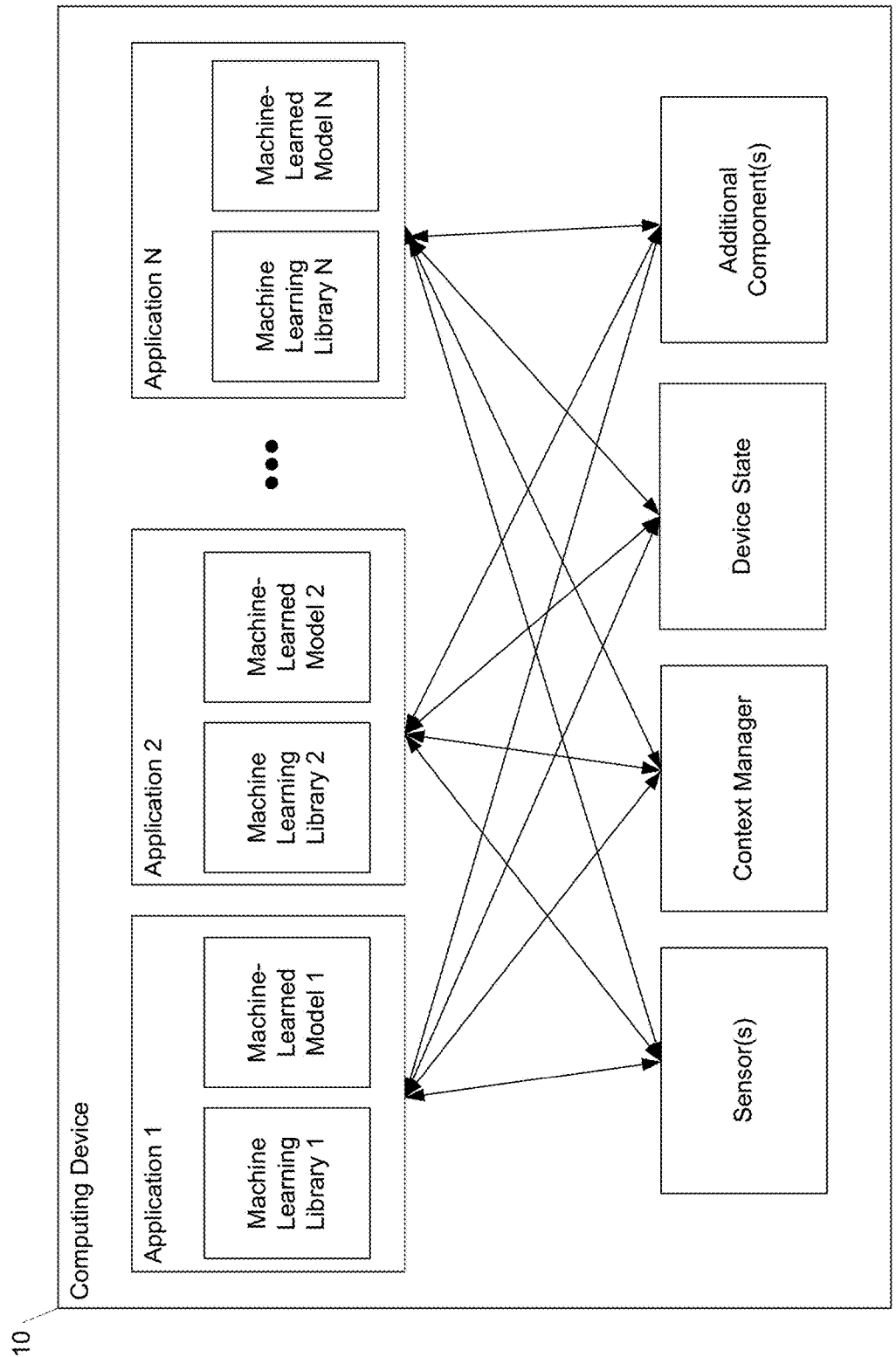
FIG. 5B depicts a block diagram of an example computing device according to example embodiments of the present disclosure.

FIG. 5B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
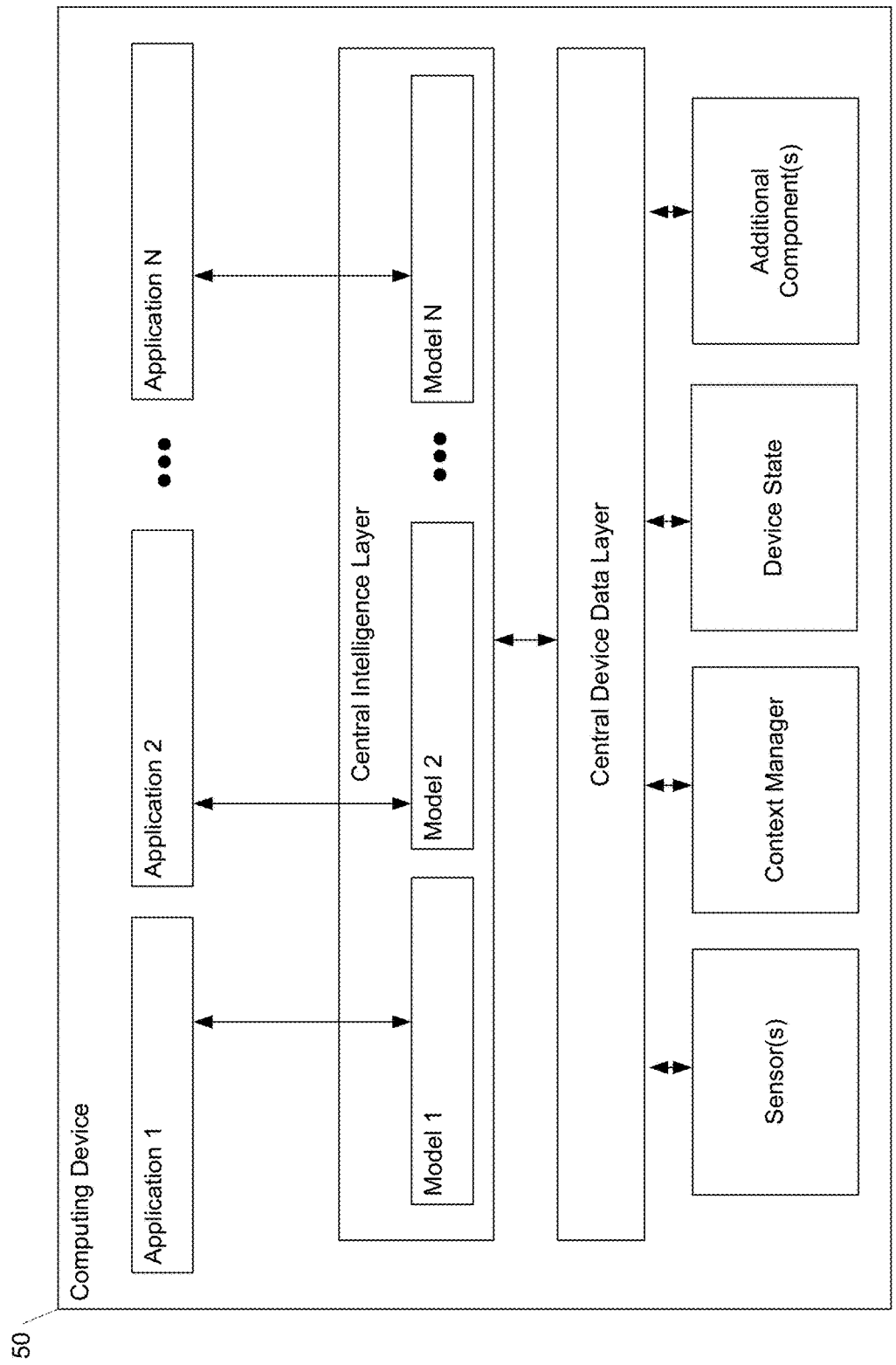
FIG. 5C depicts a block diagram of an example computing device according to example embodiments of the present disclosure.

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for performing computer vision tasks with improved efficiency, the computing system comprising:
   one or more processors; and
   one or more non-transitory computer-readable media that collectively store:
      a machine-learned computer vision model configured to process input image data to generate an output prediction, wherein the machine-learned computer vision model comprises one or more multi-axis self-attention blocks, each of the one or more multi-axis self-attention blocks comprising:
         a local processing portion configured to perform a local attention operation on a first set of feature data; and
         a global processing portion configured to perform a global attention operation on a second set of feature data;
         wherein the global processing portion and the local processing portion are arranged in a series configuration with respect to one another; and
         wherein the local attention portion is configured to perform the local attention operation on the first set of feature data by:
            partitioning the first set of feature data into a plurality of local windows; and
            performing self-attention individually on each of the plurality of local windows; and
         wherein the global attention portion is configured to perform the global attention operation on the second set of feature data by:
            partitioning the second set of feature data into a plurality of global windows based on a grid pattern; and
            performing self-attention individually on each of the plurality of global windows.

2. The computing system of claim 1, wherein, for at least one of the one or more multi-axis self-attention blocks, the local processing portion is positioned prior to the global processing portion.

3. The computing system of claim 1, wherein at least one of the one or more multi-axis self-attention blocks comprises a convolutional portion configured to perform a convolutional operation on a third set of feature data.

4. The computing system of claim 3, wherein, for the at least one of the one or more multi-axis self-attention blocks, the convolutional portion is positioned prior to the local processing portion and the global processing portion.

5. The computing system of claim 3, wherein the convolutional portion comprises an inverted linear bottleneck layer with depth-wise separable convolution.

6. The computing system of claim 1, wherein the machine-learned computer vision model comprises a plurality of multi-axis self-attention blocks.

7. The computing system of claim 6, wherein the plurality of multi-axis self-attention blocks are arranged in a sequence one after the other.

8. The computing system of claim 1, wherein each of the plurality of local windows has a predefined window size.

9. The computing system of claim 1, wherein the grid pattern comprises a fixed uniform grid such that a size of each of the plurality of global windows is adaptive.

10. The computing system of claim 1, wherein, for at least one of the one or more multi-axis self-attention blocks, the local processing portion comprises a first feed-forward network following the local attention operation and the global processing portion comprises a second feed-forward neural network following the global attention operation.

11. The computing system of claim 1, wherein the output prediction comprises an image classification prediction, an image recognition prediction, or an object recognition prediction.

12. A computer-implemented method for performing a computer vision task, the method comprising:
obtaining an input image;
processing the input image with a machine-learned computer vision model to generate an output prediction, wherein processing the input image with the machine-learned computer vision model comprises, at each of one or more multi-axis self-attention blocks of the machine-learned computer vision model:
at a local processing portion of the multi-axis self-attention block:
performing a first partitioning operation to partition a first set of feature data into a plurality of local windows; and
performing a respective local attention operation on each of the plurality of local windows; and
at a global processing portion of the multi-axis self-attention block:
performing a second partitioning operation to partition a second set of feature data into a plurality of global windows, wherein the second partitioning operation is performed based on a grid pattern; and
performing a respective global attention operation individually on each of the plurality of global windows;
wherein the local processing portion and the global processing portion are arranged in a series configuration with respect to each other; and
providing the output prediction as an output.

13. The computer-implemented method of claim 12, wherein, for at least one of the one or more multi-axis self-attention blocks, the local processing portion is positioned prior to the global processing portion.

14. The computer-implemented method of claim 12, wherein at least one of the one or more multi-axis self-attention blocks comprises a convolutional portion configured to perform a convolutional operation on a third set of feature data.

15. The computer-implemented method of claim 14, wherein, for the at least one of the one or more multi-axis self-attention blocks, the convolutional portion is positioned prior to the local processing portion and the global processing portion.

16. The computer-implemented method of claim 14, wherein the convolutional portion comprises an inverted linear bottleneck layer with depth-wise separable convolution.

17. The computer-implemented method of claim 12, wherein the machine-learned computer vision model comprises a plurality of multi-axis self-attention blocks arranged in a sequence one after the other.

18. A computing system for performing computer vision tasks with improved efficiency, the computing system comprising:
one or more processors; and
one or more non-transitory computer-readable media that collectively store:
a machine-learned computer vision model configured to process input image data to generate an output prediction, wherein the machine-learned computer vision model comprises one or more multi-axis self-attention blocks, each of the one or more multi-axis self-attention blocks comprising:
a local processing portion configured to perform a local attention operation on a first set of feature data; and
a global processing portion configured to perform a global attention operation on a second set of feature data;
wherein the global processing portion and the local processing portion are arranged in a series configuration with respect to one another; and
wherein the global attention portion is configured to perform the global attention operation on the second set of feature data by:
partitioning the second set of feature data into a plurality of global windows based on a grid pattern; and
performing self-attention individually on each of the plurality of global windows.

19. The computing system of claim 18, wherein the grid pattern comprises a fixed uniform grid such that a size of each of the plurality of global windows is adaptive.

20. A computing system for performing computer vision tasks with improved efficiency, the computing system comprising:
one or more processors; and
one or more non-transitory computer-readable media that collectively store:
a machine-learned computer vision model configured to process input image data to generate an output prediction, wherein the machine-learned computer vision model comprises one or more multi-axis self-attention blocks, each of the one or more multi-axis self-attention blocks comprising:
a local processing portion configured to perform a local attention operation on a first set of feature data; and
a global processing portion configured to perform a global attention operation on a second set of feature data;
wherein the global processing portion and the local processing portion are arranged in a series configuration with respect to one another;
wherein the local attention portion is configured to perform the local attention operation on the first set of feature data by:
partitioning the first set of feature data into a plurality of local windows; and
performing self-attention individually on each of the plurality of local windows; and
wherein at least one of the one or more multi-axis self-attention blocks comprises a convolutional portion configured to perform a convolutional operation on a third set of feature data, wherein the convolutional portion comprises an inverted linear bottleneck layer with depth-wise separable convolution.

* * * * *